(12) United States Patent
Ishii

(10) Patent No.: US 8,836,806 B2
(45) Date of Patent: Sep. 16, 2014

(54) IMAGE PICKUP APPARATUS AND IMAGE SENSOR

(75) Inventor: Mie Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 13/515,422

(22) PCT Filed: Dec. 3, 2010

(86) PCT No.: PCT/JP2010/072189
§ 371 (c)(1),
(2), (4) Date: Jun. 12, 2012

(87) PCT Pub. No.: WO2011/074486
PCT Pub. Date: Jun. 23, 2011

(65) Prior Publication Data
US 2012/0249817 A1 Oct. 4, 2012

(30) Foreign Application Priority Data

Dec. 14, 2009 (JP) ................................ 2009-282828

(51) Int. Cl.
*H04N 5/225* (2006.01)
*H04N 9/04* (2006.01)
*H04N 5/3745* (2011.01)
*H04N 5/345* (2011.01)
*H04N 5/369* (2011.01)
*H04N 5/335* (2011.01)
*H04N 5/357* (2011.01)
*H04N 5/353* (2011.01)

(52) U.S. Cl.
CPC ........... *H04N 9/045* (2013.01); *H04N 5/37452* (2013.01); *H04N 5/3456* (2013.01); *H04N 5/3696* (2013.01); *H04N 5/335* (2013.01); *H04N 5/3575* (2013.01); *H04N 5/3532* (2013.01)
USPC ...................................... 348/220.1

(58) Field of Classification Search
USPC ............................................... 348/220.1, 311
See application file for complete search history.

(56) References Cited

U.S. PATENT DOCUMENTS

2003/0160880 A1* 8/2003 Miyahara ...................... 348/262
2007/0030373 A1* 2/2007 Kobayashi et al. ........... 348/315

FOREIGN PATENT DOCUMENTS

| JP | 2003-017677 A | 1/2003 |
| JP | 2004-112034 A | 4/2004 |

(Continued)

OTHER PUBLICATIONS

Office Action issued on Dec. 10, 2013, in counterpart Japanese Application No. 2009-282828.

*Primary Examiner* — Timothy J Henn
*Assistant Examiner* — Stephen Coleman
(74) *Attorney, Agent, or Firm* — Carter, DeLuca, Farrell & Schmidt, LLP

(57) ABSTRACT

An image pickup apparatus that is capable of taking a distortion-free moving image without enlarging circuit scale. An image sensor has pixels each of which comprises a photoelectric conversion section that generates an electric charge corresponding to the incident light, a charge storage section that stores the electric charge, and an output section that outputs a voltage corresponding to the electric charge. The pixels include a first type pixel with a charge retention section that temporally holds the electric charge before transferring to the charge storage section, and a second type pixel without the charge retention section. A setting unit sets up a mode. A control unit controls to generate an image corresponding the output voltage from the first type pixel in a moving image pickup mode, and to generate an image corresponding to the output voltages from the first and second type pixels in a still image pickup mode.

8 Claims, 12 Drawing Sheets

(56) References Cited

FOREIGN PATENT DOCUMENTS

| | | |
|---|---|---|
| JP | 2007-166581 A | 6/2007 |
| JP | 2008-042825 A | 2/2008 |
| JP | 2008-072470 A | 3/2008 |
| WO | 2009/133967 A2 | 11/2009 |

* cited by examiner

IMAGE PICKUP APPARATUS AND IMAGE SENSOR

TECHNICAL FIELD

The present invention relates to an image pickup apparatus and an image sensor. Particularly, the present invention relates to the image pickup apparatus that provides moving images without image quality deterioration like distortion while shooting moving images, and the image sensor that is suitable to be used in the image pickup apparatus.

BACKGROUND ART

In recent years, many image pickup apparatuses such as digital single lens reflex cameras employ image sensors (referred to as CMOS sensors, hereafter) using CMOS (Complementary Metal Oxide Semiconductor).

A CMOS sensor has a plurality of pixels that are arranged in two dimensions. In an image pickup optical system that uses this kind of CMOS sensor, for example, a mechanical shutter may be used as a mechanical shielding member to control an exposure time.

When taking a still image, the mechanical shutter shades the pixels and all the pixels are reset under the shaded condition. Then, the mechanical shutter opens to expose the CMOS sensor so as to take suitable exposure. After a predetermined time passes, the mechanical shutter closes, and then, a signal is read to obtain a still image.

However, driving speed (i.e., shutter speed) of the mechanical shutter is limited. Accordingly, an electronic shutter is used instead of the mechanical shutter in order to increase shutter speed, in general.

Here, an example of operation of the electronic shutter will be described. It should be noted that a mechanical shutter is opened so that the CMOS sensor is always exposed when using the electronic shutter.

First, a scan to remove an unnecessary charge stored in each pixel, i.e., a reset scan, is executed for each pixel or each line of pixels. Then, when a predetermined time passes for each pixel or each line of pixels, a scan to read a stored electric charge is executed. This achieves a function of the electronic shutter. Such an electronic shutter is referred to as a "rolling electronic shutter", hereafter.

FIG. 11 is a view schematically showing an example of configuration of an image pickup unit that uses a conventional CMOS sensor. The CMOS sensor concerned is scanned by an X-Y address scanning method. An image pickup apparatus has the image pickup unit shown in the figure. FIG. 12 is a view showing an example of a circuit arrangement of each pixel of the CMOS sensor shown in FIG. 11. FIG. 12 shows one pixel among the pixels shown in FIG. 11.

It should be noted that FIG. 11 shows the CMOS sensor that has nine pixels 1104a in three lines and three columns (3-by-3 matrix) arrangement in order to simplify a description. However, an actual CMOS sensor has an extremely large number of pixels (for example, millions of pixels) that are arranged in two dimensions.

In FIG. 11, the image pickup unit that uses the CMOS sensor shown in the figure is provided with a vertical shift register (a vertical scanning circuit) 1101, readout circuits 1102 and 1110, horizontal shift registers (horizontal scanning circuits) 1106 and 1109, output amplifiers 1105 and 1111, a pixel unit 1104, constant current sources 1107a through 1107c, and selection switches 1103a through 1103c. And the pixel unit 1104 is provided with the pixels 1104a of 3-line by 3-column.

As shown in FIG. 11, in the pixel unit 1104, a signal output line 1108a is connected to three pixels 1104a on a first column, and a signal output line 1108b is connected to three pixels 1104a on a second column. Similarly, a signal output line 1108c is connected to three pixels 1104a on a third column.

Constant current sources 1107a through 1107c are connected to these output signal lines 1108a through 1108c, respectively. The output signal lines 1108a and 1108c are connected to the readout circuit 1102. The output signal line 1108b is connected to the readout circuit 1110.

As shown in FIG. 11, the readout circuit 1102 is connected to the output amplifier 1105 via the selection switches 1103a and 1103c, and the readout circuit 1110 is connected to the output amplifier 1111 via the selection switch 1103b. And the selection switches 1103a and 1103c are controlled by the horizontal shift register 1106, and the selection switch 1103b is controlled by the horizontal shift register 1109.

The above-mentioned vertical shift register 1101 gives a transfer pulse signal PTX, a reset pulse signal PRES, and selection pulse signal PSEL to the pixel unit 1104. Accordingly, the pixel unit 1104 outputs an electric charge as an output voltage as mentioned later.

It should be noted that a scan line defined by the pixels 1104a in the first line is referred to as a first scan line, here. That is, the scan line defined by the pixels 1104a of the n-th line (n is integer equal to or larger than 1; n=1, 2, or 3 in the shown example) is referred to as the n-th scan line.

The transfer pulse signal, the reset pulse signal, and the selection pulse signal that the vertical shift register 1101 applies to the n-th scan line are expressed by PTX(n), PRES(n), and PSEL(n), respectively.

In FIG. 12, the pixel 1104a has a photodiode (PD) 1201, a transfer switch 1202, a reset switch 1203, a storage region (floating diffusion: FD) 1204, a MOS amplifier 1205, and a selection switch 1206.

Incident light to the pixel 1104a is converted into an electric charge by the PD 1201. And the transfer pulse signal PTX turns the transfer switch 1202 ON, and the electric charge converted by the PD 1201 is transmitted to the FD 1204. On the other hand, the reset pulse signal PRES turns the reset switch 1203 ON, and the electric charge stored in the FD 1204 is removed. The MOS amplifier 1205 is an amplifier that functions as a source follower. The selection switch 1206 is turned ON by the selection pulse signal PSEL, and selects the pixel from which a stored electric charge is read.

What is called a floating diffusion amplifier comprises the FD 1204, the MOS amplifier 1205, and the constant current sources 1107a through 1107c mentioned later. As mentioned above, the electric charge converted by the PD 1201 of the pixel that is selected by the selection switch 1206 appears in a signal output line 1207 as an output voltage of the MOS amplifier 1205.

It should be noted that the signal output line 1207 shown in FIG. 12 shows either of the signal output lines 1108a through 1108c shown in FIG. 11.

The constant current sources 1107a through 1107c become loads on the MOS amplifier 1205, respectively, and the output voltages from the pixels 1104a on the first column are given to the readout circuit 1102. Similarly, the output voltages from the pixels 1104a on the third column are given to the readout circuit 1102. The output voltages from the pixels 1104a on the second column are given to the readout circuit 1110.

As mentioned above, the selection switches 1103a and 1103c are driven and controlled by the horizontal shift register 1106. The output voltages read by the readout circuit 1102 are driven and controlled by the selection switches 1103*a* and 1103*c*, and are outputted via the output amplifier 1105.

The selection switch 1103*b* is driven and controlled by the horizontal shift register 1109. The output voltages read by the readout circuit 1110 are driven and controlled by the selection switch 1103*b*, and are outputted via the output amplifier 1111.

FIG. 13 is a view showing an operating sequence when the CMOS image pickup unit shown in FIG. 11 makes a rolling electronic shutter operate. It should be noted that FIG. 13 shows a driving control for selected four lines from the n-th scan line to the (n+3)th scan line in order to simplify the description.

First, in the n-th scan line, the reset pulse signal PRES(n) and the transfer pulse signal PTX(n) are applied to the pixel unit 1104 of the CMOS sensor during a period between the time t32 and the time t31. This turns ON the transfer switch 1202 and the reset switch 1203 shown in FIG. 12. The reset operation is executed to remove the unnecessary electric charge stored in the PD 1201 and the FD 1204 in the pixel 1104*a* of the n-th scan line (the n-th line).

Then, the transfer switch 1202 turns OFF at the time t32, and the storage operation to store an electric charge generated in the PD 1201 is started. Next, at the time t34, the transfer pulse signal PTX (n) is applied to the pixel unit 1104, and the transfer switch 1202 is set to ON. This causes a transfer operation to transfer the electric charge of the PD 1201 to the FD 1204.

It should be noted that the reset switch 1203 must turn OFF before the above-mentioned transfer operation. In the drive controlling shown in FIG. 13, the reset switch 1203 and the transfer switch 1202 turn OFF simultaneously at the time t32.

As mentioned above, the time period from the end of reset operation at the time t32 to the end of transfer at the time t35 becomes storage time.

The selection pulse signal PSEL(n) is applied to the pixel unit 1104 after finishing the transfer operation for the electric charge stored in the pixel 1104*a* of the n-th line. This turns the selection switch 1206 ON. When the selection switch 1206 turns ON, the electric charge stored in the FD 1204 is converted into a voltage, and the voltage is outputted to the readout circuits 1102 and 1110 as the output voltage.

The voltage signals temporarily held by the readout circuits 1102 and 1110 are sequentially outputted by the horizontal shift registers 1106 and 1109 from the time t36. A time period from a start of transfer at the time T34 to an end of readout at the time t37 is defined as T3read, and a time period from the time t31 to the time t33 is defined as T3wait.

It should be noted that a time period from a start of transfer to an end of readout also becomes the T3read in another scan line, and a time period from a start of reset for a certain scan line to a start of reset for a next scan line also becomes T3wait.

The drive method of the above-mentioned rolling electronic shutter enables to take a still image. As shown in FIG. 13, the transfer pulse signal PTX(n+3) and the selection pulse signal PSEL(n+3) are applied at the second time following the reset. Then, the transfer pulse signals PTX(n) through PTX(n+3) and the selection pulse signals PSEL(n) through PSEL(n+3) are repeatedly applied without resetting. Accordingly, the signal for moving images of which the readout interval is the storage time Tint can be acquired.

There is what is called a batch electronic shutter operation MOS type image sensor that executes a reset operation and a read operation by one operation. FIG. 14 is a view showing an operating sequence of the batch electronic shutter operation MOS type image sensor.

In FIG. 14, the reset actions for all the scan lines are simultaneously executed between the time t41 and the time t42. And the transfer operations are also simultaneously executed between the time t43 and the time t44. In the operation of the batch electronic shutter, the storage time is a time period between the time t42 and the time t44 for all the scan lines (for example, see PTL 1).

Incidentally, the CMOS sensor is required to increase the pixel number, the shooting speed, and the ISO (sensitivity). Such a CMOS sensor with a large number of pixels is extremely useful to take a high definition still image. The pixel number is over 10 million pixels in recent years.

On the other hand, the pixel number required to take a moving image is about 300 thousand pixels in general and is about 2 million pixels when conforming to the full standard of high-definition TV, which is fewer than the pixel number required to take a still image. A frame rate is about 30 frames per second or 60 frames per second.

When taking a moving image using the CMOS sensor with a large number of pixels that is designed to take a still image, it is common to perform a process for thinning out pixels or a process for summing pixels from a point of view of a pixel number and a frame rate.

As a method to increase shooting speed, there is a known technique to arrange charge-storage elements (pixel memories) around the PD corresponding to each pixel and to store electric charges into these charge-storage elements when storing (for example, see PTL 2).

CITATION LIST

Patent Literature

PTL 1: Japanese Laid-Open Patent Publication (Kokai) No. 2003-17677 (JP2003-17677A)

PTL 2: Japanese Laid-Open Patent Publication (Kokai) No. 2008-42825 (JP2008-42825A)

SUMMARY OF INVENTION

Technical Problem

However, the above-mentioned operation method of the rolling electronic shutter has a problem that the charge storing timing differs with the position of the scan line between the upper side and the lower side in the screen by the time period required to scan the screen.

The above-mentioned phenomenon arises because the time T3wait from the reset and transfer of a certain scan line to the reset and transfer of a next scan line is necessarily longer than the time T3read from the start of transfer to the end of read.

That's because the output voltage of the next scan line will be outputted to the readout circuit before the read operation of the current scan line is completed, if the time T3wait is shorter than the time T3read. In such a case, exact image information cannot be obtained.

Therefore, the conventional rolling electronic shutter cannot read out the output voltage at high speed, and particularly, when the pixel number is large, a deviation of the storing timings between the upper part and the lower part of the screen becomes large.

On the other hand, the batch electronic shutter is possible to unify the storing timings among all the scan lines. Usually, a noise signal is read out and then an electric charge signal stored in the PD is read out. The output voltage is obtained by subtracting the noise signal from the electric charge signal in order to remove a noise inherent to each pixel. Here, the noise signal is a reset release signal to the pixel just before reading the output voltage.

However, if the transfer operations for all the scan lines are executed simultaneously to transfer the electric charges to the FD, it will become impossible to read the noise signal. That is, it becomes impossible to cancel a noise and an image obtained will contain much random noise.

If a pixel memory is arranged corresponding to each pixel, a pixel signal (i.e., the output voltage) can be held by the pixel memory. When the pixel signal held in the pixel memory is read out after reading out the noise signal, the output voltage containing little noise can be obtained by calculating a difference between the pixel signal and the noise signal.

However, if the pixel memory is incorporated corresponding to every pixel, a circuit scale becomes large, and the area of the PD must be reduced compared with a case where there is no pixel memory. Therefore, the sensitivity decreases as compared with the case where there is no pixel memory.

The present invention provides an image pickup apparatus that is capable of taking a distortion-free moving image without enlarging circuit scale.

Further, the present invention provides an image pickup apparatus that is capable of taking a still image that does not spoil a dynamic range.

Solution of Problem

Accordingly, the present invention provides an image pickup apparatus that generates an image corresponding to an incident light, comprising an image sensor that is configured by arranging a plurality of pixels each of which comprises a photoelectric conversion section that generates an electric charge corresponding to the incident light, a charge storage section that stores the electric charge transferred from the photoelectric conversion section, and an output section that outputs a voltage corresponding to the electric charge stored in the charge storage section, the pixels including a first type pixel with a charge retention section that temporally holds the electric charge generated by the photoelectric conversion section before transferring to the charge storage section, and a second type pixel without the charge retention section, a setting unit that sets up a moving image pickup mode or a still image pickup mode, and a control unit that controls to generate an image corresponding the output voltage from the first type pixel when the setting unit sets up the moving image pickup mode, and to generate an image corresponding to the output voltages from the first type pixel and the second type pixel when the setting unit sets up the still image pickup mode.

Advantageous Effects of Invention

According to the present invention, since the first type pixel that is provided with the charge retention section and the second type pixel that is not provided with the charge retention section are selectively used according to the usage, the image pickup apparatus that is capable of taking a distortion-free moving image without enlarging circuit scale and is capable of taking a still image that does not spoil a dynamic range can be provided.

Further features of the present invention will become apparent from the following description of exemplary embodiments with reference to the attached drawings.

DESCRIPTION OF EMBODIMENTS

Figure 1:
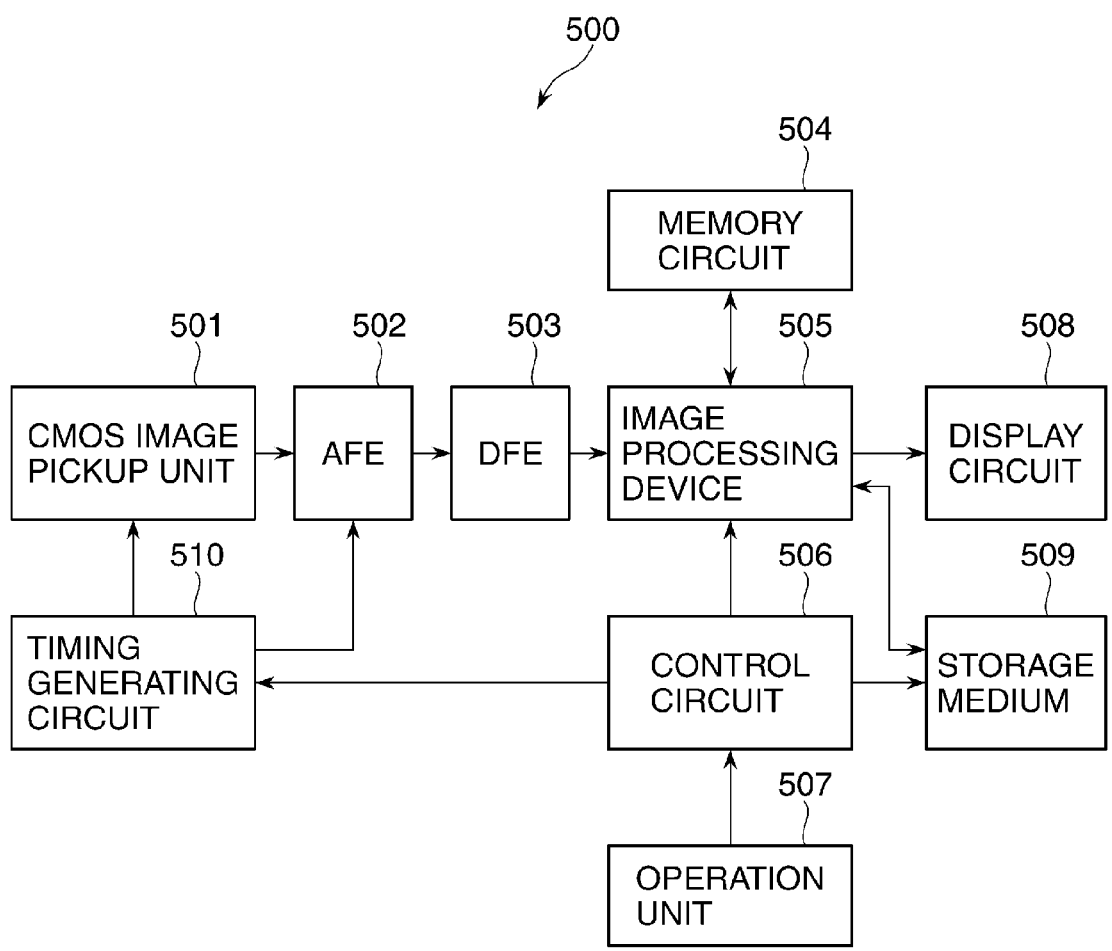
FIG. 1 is a block diagram schematically showing a configuration of an image pickup apparatus according to an embodiment of the present invention.

Hereafter, an example of the image pickup apparatus according to an embodiment of the present invention will be described with reference to the attached drawings. FIG. 1 is a block diagram schematically showing an example of the image pickup apparatus according to the embodiment of the present invention. This image pickup apparatus is a digital single lens reflex camera, for example. The image pickup apparatus shown in the figure has a moving image pickup mode (a movie mode) for taking a moving image, and a still image pickup mode (a still image mode) for taking a still image.

In FIG. 1, the image pickup apparatus 500 has a CMOS image pickup unit 501 of which a configuration is mentioned later, and this CMOS image pickup unit 501 is provided with a CMOS sensor (not shown in FIG. 1) that has a plurality of pixels. Further, the image pickup apparatus 500 shown in the figure is provided with an analog front end (AFE) 502, a digital front end (DFE) 503, a memory circuit 504, an image processing device 505, a control circuit 506, an operation unit 507, a display circuit 508, a storage medium 509, and a timing generating circuit 510.

The CMOS image pickup unit 501 stores an image taken through an image pickup lens (not shown) as electric charges. And the CMOS image pickup unit 501 outputs a voltage signal (an output voltage) corresponding to the image as mentioned later.

The AFE 502 amplifies the voltage signal outputted from the CMOS image pickup unit 501, adjusts a black level (an OB clamp) etc., and outputs the analog signal that represents an image signal. In adjustment of the black level, the AFE 502 executes a black level adjustment process according to an OB clamp timing signal and an OB clamp target level signal that are outputted from the timing generating circuit 510.

The DFE 503 converts the analog signal outputted from the AFE 502 into a digital signal. In this case, the DFE 503 executes digital processes such as a correction of the image signal and an exchange of pixels. Receiving the digital signal from the DFE 503, the image processing device 505 executes a development process, and displays it on the display circuit 508 as an image.

In the development process, the memory circuit 504 is used as a working memory. This memory circuit is used as a buffer memory when the development process cannot catch up due to continuous shootings.

In this case, the image processing device 505 stores an image into the storage medium 509 under control of the control circuit 506. It should be noted that a Compact Flash (registered trademark) memory is used for the storage medium 509, for example.

The operation unit 507 has a power switch (not shown) for starting the image pickup apparatus 500, a shutter switch (not shown), etc. The shutter switch is used to instruct to start image pickup preparing operations such as a metering process and a distance-measuring process, and to start a series of image pickup operations, which include an operation to process a voltage signal read from the CMOS image pickup unit 501 with driving a mirror and a shutter and an operation to write the processed signal into the storage medium 509, for example.

It should be noted that the above-mentioned moving image pickup mode or still image pickup mode is selected by the operation unit 507.

The control circuit 506 controls the image pickup apparatus 500, and sends a command to the timing generating circuit 510 according to an instruction from the operation unit 507.

Figure 2:
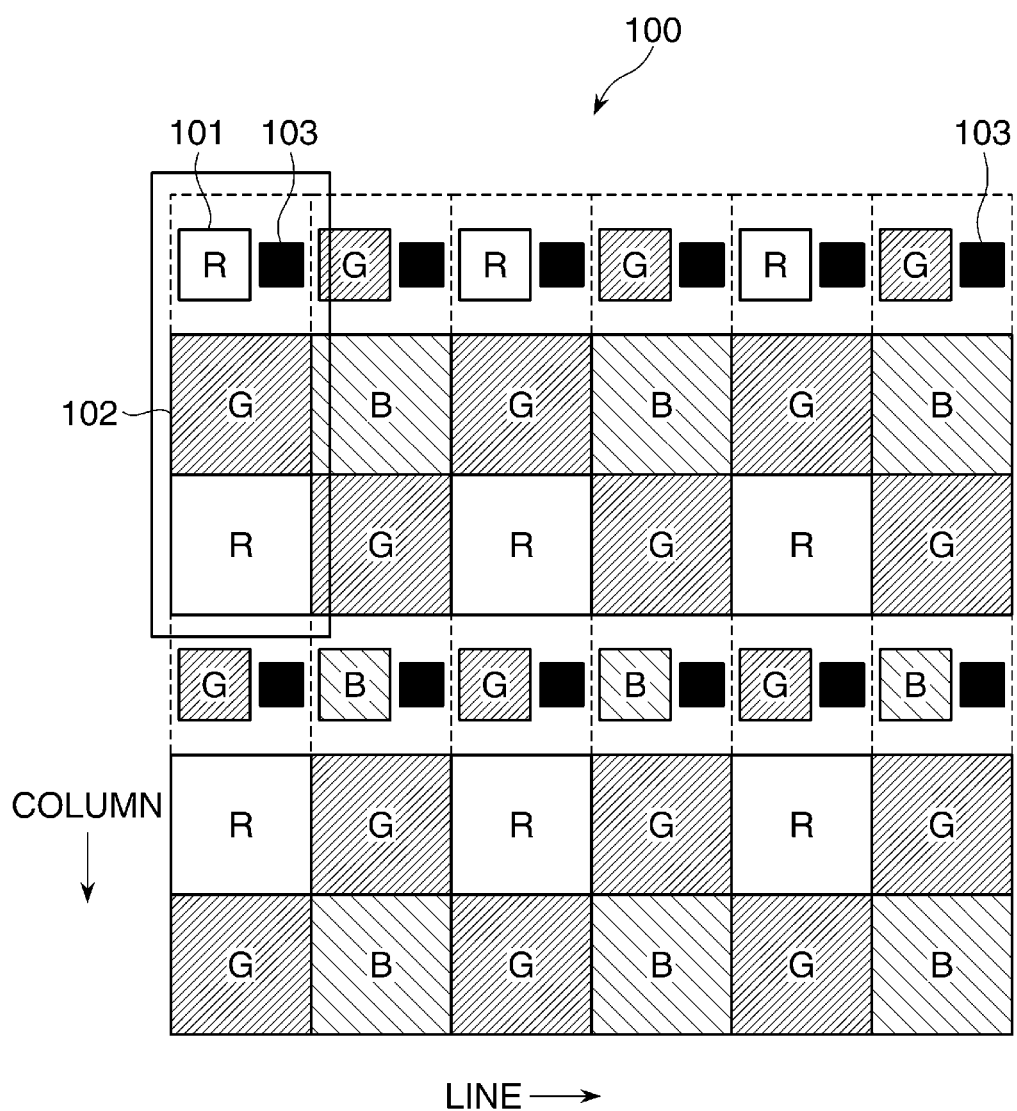
FIG. 2 is a view showing an example of a pixel arrangement in a CMOS sensor used in the image pickup apparatus shown in FIG. 1.

FIG. 2 is a view showing an example of a pixel arrangement in the CMOS sensor used in the image pickup apparatus 500 shown in FIG. 1.

In FIG. 2, the illustrated CMOS sensor 100 is equipped with first type pixels 101 each of which has a charge retention section 103, and second type pixels 102 each of which does not have a charge retention section, and these pixels 101 and 102 are arranged in a matrix form. Each pixel is provided with filters for receiving a red component (R), a green component (G), and a blue component (B) of the image formed on the CMOS sensor 100, respectively.

In the illustrated example, the pixels 101 are arranged every three lines. Here, since the pixel 101 has the electric charge storage unit 103, a size of a photodiode (PD: photoelectronic conversion unit (not shown in FIG. 2)) of the pixel 101 is smaller than that of the pixel 102.

Figure 3:
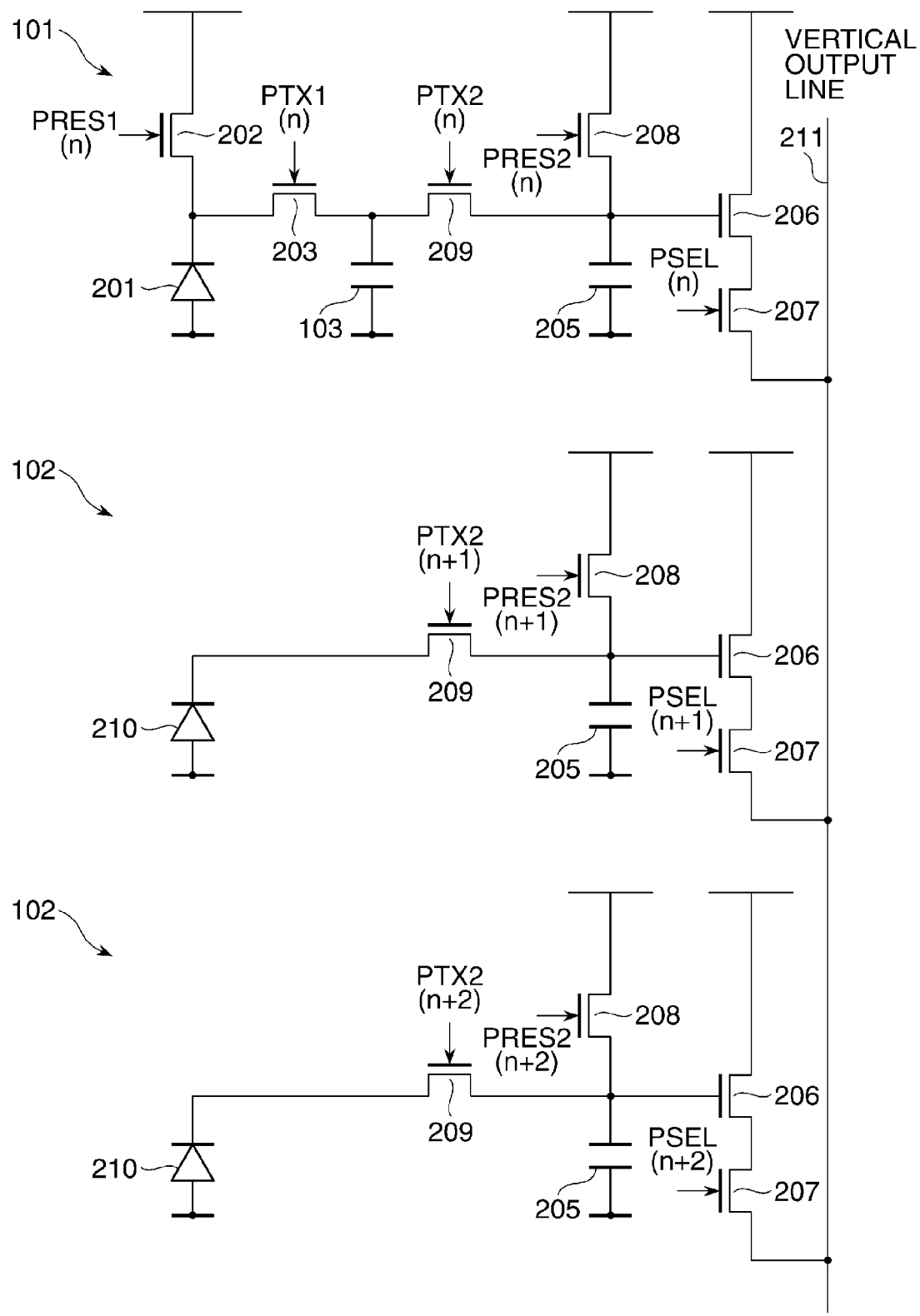
FIG. 3 is a view showing an example of a pixel circuit for three pixels in the CMOS sensor shown in FIG. 2.

FIG. 3 is a view showing an example of pixel circuits for three pixels in the CMOS sensor 100 shown in FIG. 2. Here, the circuits corresponding to the three pixels surrounded by a rectangle frame of thick line shown in FIG. 2 are shown.

In FIG. 3, the pixel 101 has a PD 201. The PD 201 receives a light image (an incident light) formed by an image pickup lens (not shown), generates an electric charge corresponding to the light image, and stores it. A reset switch 202 operates according to a reset pulse signal PRES1 mentioned later. When the reset pulse signal PRES1($n$) raises to the high level (H) under the condition where a transfer switch 203 is in OFF (namely, cut off), the reset switch 202 resets the electric charge stored in the PD 201 ($n$ is one or more integer).

The above-mentioned transfer switch 203 operates according to a transfer pulse signal PTX1($n$). The charge retention section 103 once holds the electric charge that has been stored in the PD 201 and has been transmitted through the transfer switch 203.

A transfer switch 209 of the pixel 101 operates according to a transfer pulse signal PTX2($n$). The electric charge stored by the PD 201 or the electric charge held in the charge retention section 103 is transmitted to an FD 205 through the transfer switch 209.

A reset switch 208 of the pixel 101 operates according to a reset pulse signal PRES2($n$). The reset switch 208 resets an electric potential of the charge retention section 103 to VDD through the transfer switch 209 according to an electric potential of the FD 205.

A selection switch 207 of the pixel 101 operates according to a selection pulse signal PSEL($n$). When the selection switch 207 turns on, a voltage corresponding to the electric charge transmitted to the FD 205 is outputted to a vertical output line 211 from a source follower amplifier 206. It should be noted that the output voltages of the pixels in one line are outputted at a time according to the operation of the selection switch 207.

Thus, the pixel 101 is provided with the charge retention section 103 and the reset switch 202, and also executes a charge-storage operation by the PD 201 while outputting the output voltages to the vertical output line 211.

On the other hand, the pixel 102 has a PD 210. The PD 210 receives a light image (an incident light) formed by an image pickup lens (not shown), generates an electric charge corresponding to the light image, and stores it. The electric charge stored in the PD 210 is transmitted to an FD 205 by a transfer switch 209.

And according to an operation of a selection switch 207, the electric charge transmitted to the FD 205 is outputted to the vertical output line 211 as the output voltages from a source follower amplifier 206. It should be noted that a reset switch 208 resets the electric charge (i.e., the electric potential) of the PD 210 to VDD through the transfer switch 209 according to the electric potential of the FD 205.

Figure 4:
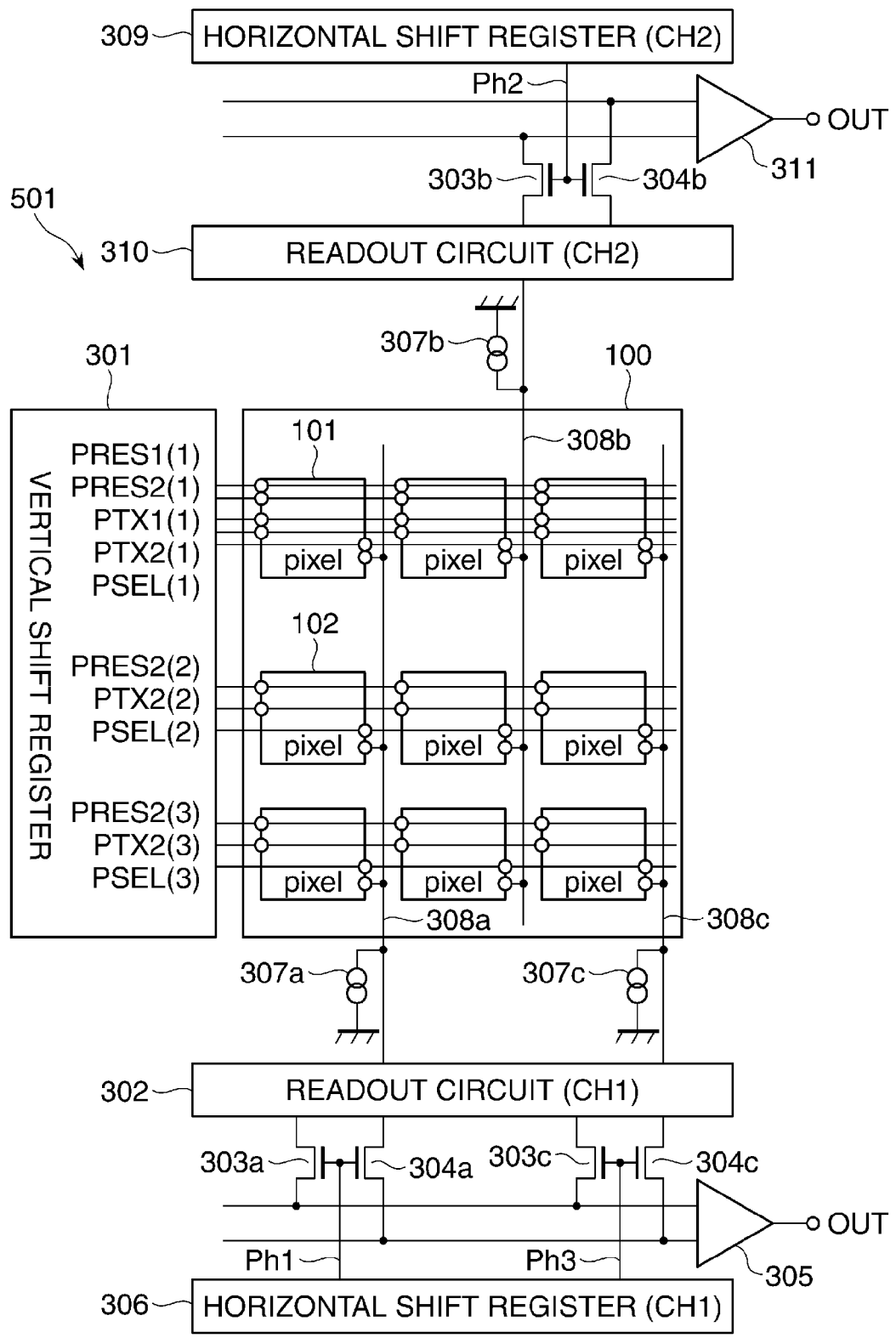
FIG. 4 is a block diagram schematically showing an example of a CMOS image pickup unit using the CMOS sensor shown in FIG. 3.

FIG. 4 is a block diagram schematically showing an example of the CMOS image pickup unit using the CMOS sensor 100 shown in FIG. 2. Here, the CMOS sensor 100 has the pixels 101 and 102 of 3-line by 3-column, the pixels 101 are arranged on the first line, and the pixels 102 are arranged on the other lines.

In FIG. 4, the CMOS image pickup unit 501 is provided with a vertical shift register (a vertical scanning circuit) 301, readout circuits 302 and 310, horizontal shift registers (horizontal scanning circuits) 306 and 309, differential amplifiers 305 and 311, the image sensor 100, constant current sources 307a through 307c, and selection switches 303a through 303c and 304a through 304c that are constituted by n-channel MOS transistors.

As shown in FIG. 4, in the CMOS sensor 100, a vertical output line 308a is connected to the three pixels 101 and 102 on a first column, and a vertical output line 308b is connected to the three pixels 101 and 102 on a second column. Similarly, a vertical output line 308c is connected to the three pixels 101 and 102 on a third column.

Constant current sources 307a through 307c are connected to these vertical output lines 308a through 308c, respectively. The vertical output lines 308a and 308c are connected to the readout circuit 302. The vertical output line 308b is connected to the readout circuit 310. It should be noted that the vertical output line 211 shown in FIG. 3 corresponds to the vertical output lines 308a, 308b, and 308c shown in FIG. 4.

As shown in FIG. 4, the readout circuit 302 is connected to the differential amplifier 305 through the selection switches 303a, 304a, 303c, and 304c. Moreover, the readout circuit 310 is connected to the differential amplifier 311 through the selection switches 303b and 304b.

The selection switches 303a, 304a, 303c, and 304c are controlled by selection pulse signals Ph1 and Ph3 outputted from the horizontal shift register 306. The selection switches 303b and 304b are controlled by a selection pulse signal Ph2 outputted from the horizontal shift register 309.

The above-mentioned vertical shift register 301 gives transfer pulse signals PTX1(1), PTX2(1), PTX2(2), and PTX2(3), reset pulse signals PRES1(1), PRES2(1), PRES2(2), and PRES2(3), and selection pulse signals PSEL(1), PSEL(2), and PSEL(3) to the CMOS sensor 100.

In the CMOS sensor 100, a scan line defined by the pixels 101 in the first line is referred to as a first scan line, here. That is, the scan line defined by the pixels of the n-th line (n is integer equal to or larger than 1) is referred as the n-th scan line. The transfer pulse signals applied to the n-th scan line by the vertical shift register 301 are represented by PTX1(n) and PTX2(n). In the same manner, the reset pulse signals are represented by PRES1(n) and PRES2(n), and the selection pulse signal is represented by PSEL(n).

In the CMOS image pickup unit 501 shown in FIG. 4, each of the pixels 101 and 102 corresponds to a pixel, and an odd-number column is a first channel (CH1), and an even-number column is a second channel (CH2).

Incidentally, the selection switches 303a and 304a correspond to the vertical output line 308a. The readout circuit 302 outputs the output voltages appeared in the vertical output line 308a to the differential amplifier 305 as a pixel signal and a noise signal through the selection switches 303a and 304a, respectively.

Similarly, the selection switches 303c and 304c correspond to the vertical output line 308c. The readout circuit 302 outputs the output voltages appeared in the vertical output line 308c to the differential amplifier 305 as a pixel signal and a noise signal through the selection switches 303c and 304c, respectively. And the differential amplifier 305 outputs the difference between these pixel signal and noise signal as a differential output signal.

The selection switches 303b and 304b correspond to the vertical output line 308b. The readout circuit 310 outputs the output voltages appeared in the vertical output line 308b to the differential amplifier 311 as a pixel signal and a noise signal through the selection switches 303b and 304b, respectively. And the differential amplifier 311 outputs the difference of these pixel signal and noise signal as a differential output signal.

With reference to FIG. 3 and FIG. 4, signal applications will be described assuming n=1. In the pixel 101, a reset pulse signal PRES1(1) outputted from the vertical shift register 301 is applied to a gate of the reset switch 202. Moreover, in the pixels 101 and 102, reset pulse signals PRES2(1), PRES2(2), and PRES2(3) outputted from the vertical shift register 301 are applied to gates of the reset switches 208, respectively.

In the pixel 101, a transfer pulse signal PXT1(1) outputted from the vertical shift register 301 is applied to a gate of the transfer switch 203. Moreover, in the pixels 101 and 102, transfer pulse signals PTX2(1), PTX2(2), and PTX2(3) outputted from the vertical shift register 301 are applied to gates of the transfer switches 209, respectively.

Moreover, in the pixels 101 and 102, selection pulse signals PSEL(1), PSEL(2), and PSEL(3) outputted from the vertical shift register 301 are applied to gates of the selection switches 207, respectively. And sources of these selection switches 207 are connected to the vertical output line 211 shown in FIG. 3 (corresponding to the vertical output lines 308a, 308b, and 308c in FIG. 4).

Figure 5:
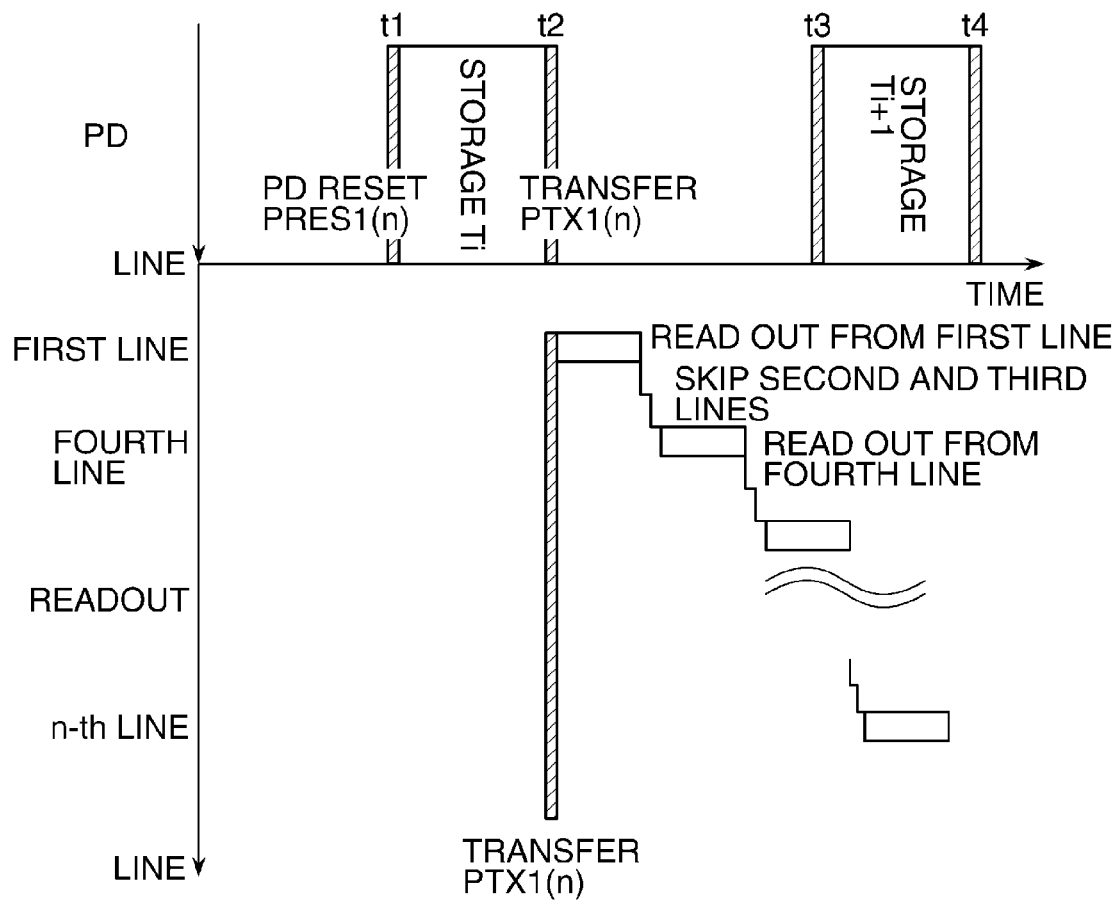
FIG. 5 is a view schematically showing an operation of the image pickup apparatus shown in FIG. 1 in a moving image pickup mode (a movie mode).

Next, an operation of the image pickup apparatus shown in FIG. 1 in the moving image pickup mode will be described. FIG. 5 is a view schematically showing the operation of the image pickup apparatus shown in FIG. 1 in the moving image pickup mode.

In FIG. 5, a horizontal axis represents time. A vertical axis represents a position of a line in the image sensor 100. It should be noted that an upper part in the figure shows an operation of the PD, and a lower part shows an operation until reading out after transferring the electric charge from the PD.

As shown in FIG. 5, a charge-storage operation is performed in storage time Ti. It should be noted that every line in which the pixel 101 is arranged is simultaneously reset by the reset switch 202 (FIG. 3) at the time t1 so as not to generate a gap between a charge storage time in the upper part in a screen and that in a lower part in the screen displayed on the display circuit 508 shown in FIG. 1.

With reference to FIG. 3, FIG. 4, and FIG. 5, the operation in the moving image pickup mode will be described. In FIG. 4, the CMOS sensor 100 has the pixels of n-line by n-column, and the above-mentioned pixel 101 having the charge retention section 103 is arranged in (3 m+1)th line (m is an integer equal to or larger than 0).

After the storage time Ti passes, at time t2, the vertical shift register 301 turns on the transfer switch 203 by the transfer pulse signal PTX1(n). This transfers the electric charge from the PD 201 to the charge retention section 103 via the transfer switch 203. This charge transfer operation is simultaneously performed about every line in which the pixel 101 is arranged.

In the moving image pickup mode, only the pixel 101 equipped with the charge retention section 103 is used, and the pixel 102 is not used. That is, when shooting the moving image, the pixels are thinned out every three lines. Accordingly, the vertical shift register 301 maintains ON state of the reset switch 208 of the pixel 102 by the reset pulse signals PRES2(n+1) and PRES2(n+2) (see FIG. 3).

If the reset switch 208 of the pixel 102 is not in the ON state (that is, a reset state), the PD 210 of the pixel 102 stores an electric charge, which may attend evils such as a leakage of an electric charge to surrounding pixels.

A readout operation from the CMOS sensor 100 is sequentially performed from the first line. The vertical shift register 301 selects the pixel 101 located in the (3 m+1)th line. That is, the vertical shift register 301 selects the first line, the fourth line, the seventh line, and . . . one by one.

The vertical shift register 301 raises the transfer pulse signal PTX2(n) to the high level in the selected line in order to turn on the transfer switch 209. This transfers the electric charge stored in the charge retention section 103 to an FD 205 through the transfer switch 209. And the signals are sequentially read out from the pixels 101 arranged in the horizontal direction (i.e., a line direction). After finishing the readout operations for all the pixels 101 in a certain line, the readout operations for the pixels 101 in a next line start.

Next, the vertical shift register 301 resets the PD 201 by the reset pulse signal PRES1(n) at the time t3 according to a frame rate to be driven and storage time. This once resets the electric charge of the PD 201 and restart the storage operation. The above-mentioned readout operation is repeated in the moving image pickup mode.

Figure 6:
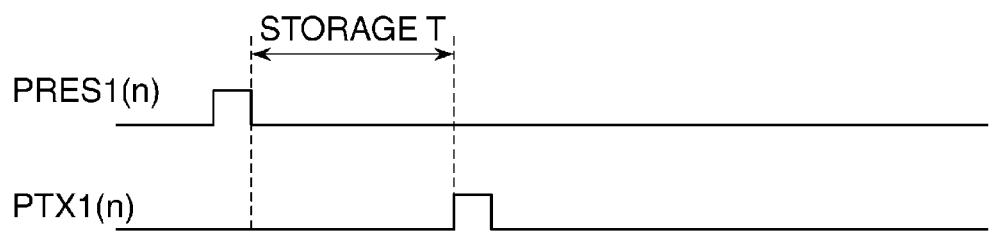
FIG. 6 is a timing chart showing an example of an operation about charge storage of a photodiode when the image pickup apparatus shown in FIG. 1 is in the moving image pickup mode (the movie mode).
Figure 7:
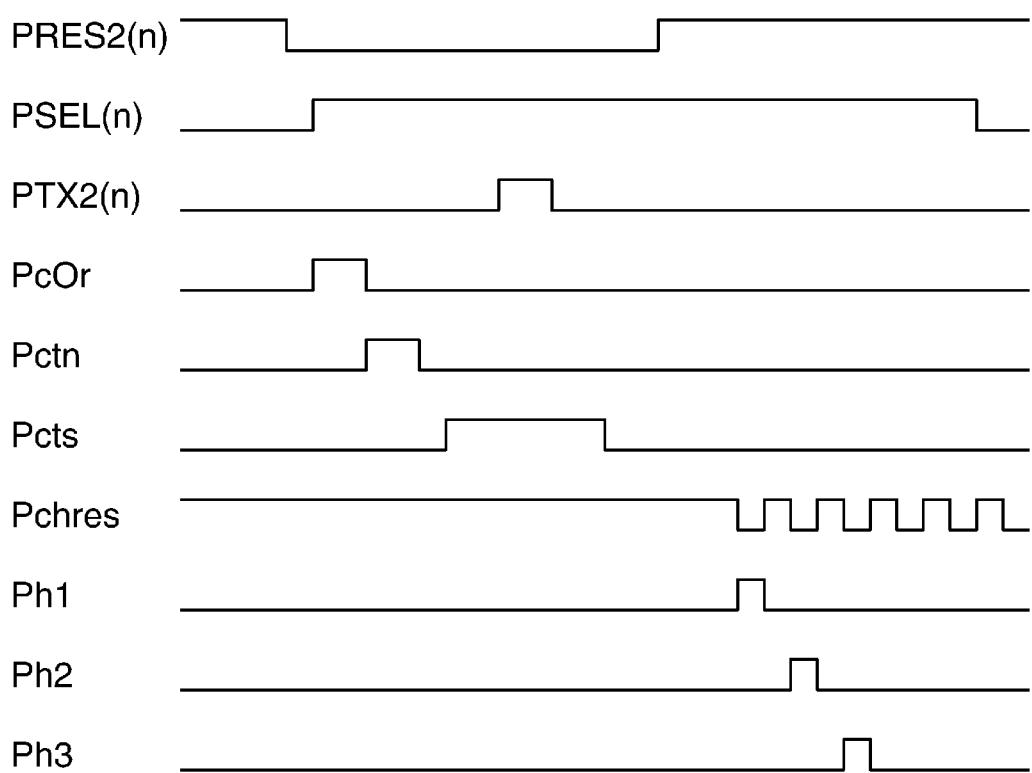
FIG. 7 is a timing chart showing an example of a readout operation after an electric charge has been transferred to a charge retention section when the image pickup apparatus shown in FIG. 1 is in the moving image pickup mode.

FIG. 6 is a timing chart showing an example of an charge-storage operation of a photodiode when the image pickup apparatus shown in FIG. 1 is in the moving image pickup mode. FIG. 7 is a timing chart showing an example of the readout operation after the electric charge has been transferred to the charge retention section 103 when the image pickup apparatus shown in FIG. 1 is in the moving image pickup mode.

Here, operations of the image pickup apparatus shown in FIG. 1 in the moving image pickup mode will be described in detail with reference to FIG. 6 and FIG. 7 in addition to FIG. 3 and FIG. 4. As mentioned above, the line in which the pixel 101 is arranged is used in the moving image pickup mode. In this case, as shown in FIG. 6, the vertical shift register 301 raises the reset pulse signal PRES1(n) to the high-level, and turns on the reset switch 202 of the pixel 101. This resets the electric charge of the PD 201.

And as shown in FIG. 6, after desired time (predetermined time) T passes, the vertical shift register 301 raises the transfer pulse signal PTX1(n) to the high-level, and turns on the transfer switch 203 of the pixel. This transfers the charge stored in the PD 201 to the charge retention section 103 through the transfer switch 203.

In the pixels 102, the vertical shift register 301 raises the reset pulse signals PRES2(n+1) and PRES2(n+2) to the high-level, and turns on the reset switches 208.

In the read operation, the vertical shift register 301 keeps the transfer pulse signal PTX1(n) in the low-level (L) until the read operation is completed. That is, the transfer switch 203 is turned off.

Figure 8:
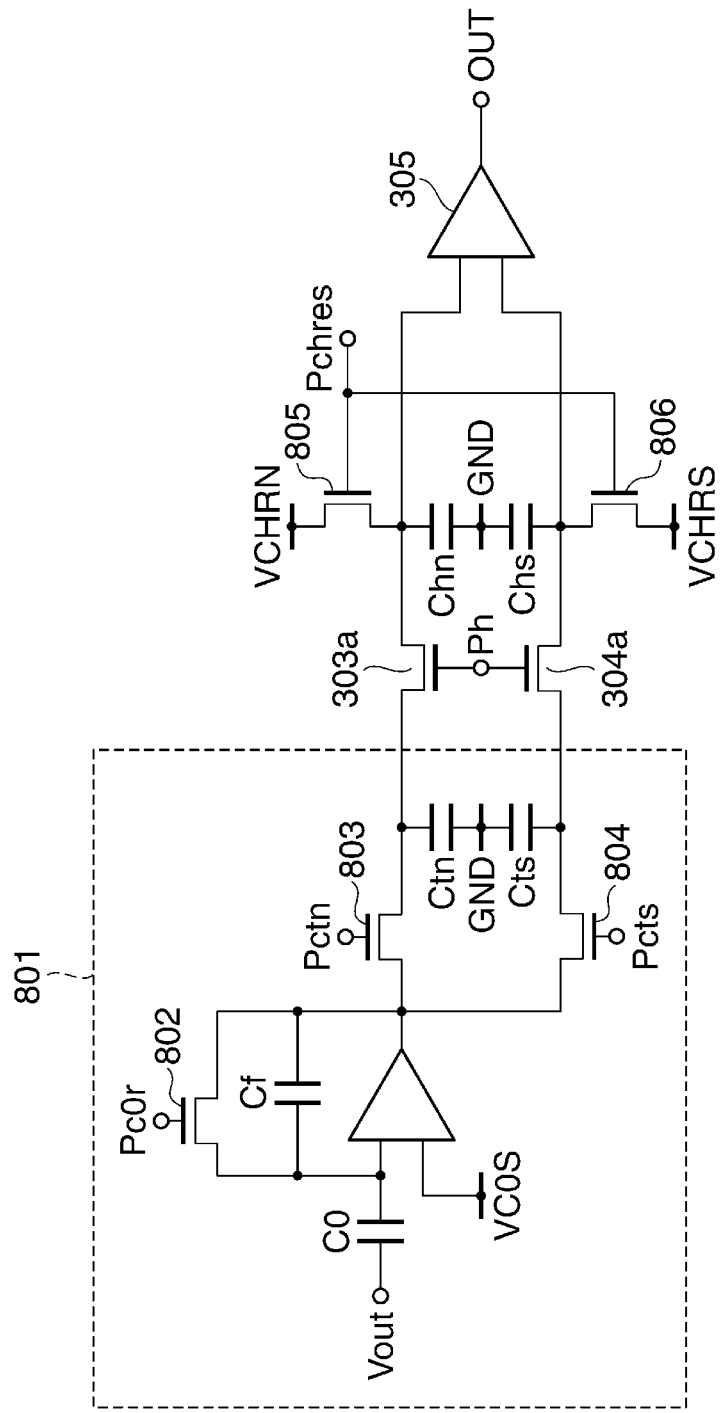
FIG. 8 is a view showing an example of a configuration of a readout circuit shown in FIG. 4.

FIG. 8 is a view showing a configuration example of the readout circuit 302 shown in FIG. 4. Although FIG. 8 shows only one readout block 801 for one column of the CMOS sensor 100 for the sake of expediency as indicated by a broken line, readout blocks of which number is identical to the number of columns of the CMOS sensor 100 are provided in fact.

For example, the illustrated readout block 801 corresponds to the vertical output line 308a shown in FIG. 4, and a similar readout block, which is not illustrated, is provided corresponding to the vertical output line 308c shown in FIG. 4. That is, in the example shown in FIG. 4, the readout circuit 302 has two readout blocks 801.

Similarly, the readout circuit 310 shown in FIG. 4 has one readout block 801 corresponding to the vertical output line 308b.

As mentioned above, the readout circuit 302 shown in FIG. 4 includes the two readout blocks 801. The vertical output lines 308a and 308c are connected to the input terminals Vout of the two readout blocks 801, respectively. Similarly, the readout circuit 310 shown in FIG. 4 includes one readout block 801. The vertical output line 308b is connected to the input terminal Vout of the readout block 801. It should be noted that FIG. 8 shows only one readout block 801 corresponding to the vertical output line 308a.

Here, the readout operation from the pixel 101 arranged in the first line will be described with reference to FIG. 3, FIG. 4, FIG. 7, and FIG. 8.

Before reading an electric charge from the charge retention section 103, the vertical shift register 301 raises the reset pulse signal PRES2(n) to the high-level. This resets the gate of the reset switch 208 to a reset power supply voltage.

If the reset pulse signal PRES2(n) returns to the low-level, i.e., if the gate voltage of the reset switch 208 becomes the low-level, a gate voltage Pc0r of a clamp switch 802 becomes the high-level, and then, the selection pulse signal PSEL(n) becomes the high-level. That is, the gate voltage of the selection switch 207 becomes the high-level. Accordingly, the reset signal on which a reset noise is superimposed (i.e., a noise signal) is inputted into the input terminal Vout, and is clamped by a clamp capacitor C0.

Next, after the gate voltage Pc0r of the clamp switch 802 returns to the low-level, a gate voltage Pctn of a transfer switch 803 at a noise signal side becomes the high-level, and a reset signal is held by a noise retention capacitor Ctn.

Then, after a gate voltage Pcts of a transfer switch 804 at a pixel signal side becomes the high-level, the transfer pulse signal PTX2(n) becomes the high-level. That is, the gate voltage of the transfer switch 209 becomes the high-level. Accordingly, the electric charge held by the charge retention section 103 is transferred to the gate of the source follower amplifier 206, and is inputted into the input terminal Vout as the output voltage.

Next, after the transfer pulse signal PTX2(n) returns to the low-level, i.e., after the gate voltage of the transfer switch 209 returns to the low-level, the gate voltage Pcts of the transfer switch 804 at the pixel signal side becomes the low-level. Accordingly, a change from the reset signal (a light signal) is read out and held by a signal retention capacitor Cts.

According to the above-mentioned operation, the outputs from the pixels arranged in the first line are stored in the signal retention capacitors Ctn and Cts of the respective readout blocks 801. That is, in the readout circuit 302, the output of the pixel 101 located at the first line/first column is stored in one of the two readout blocks 801, and the output of the pixel 101 located at the first line/third columns is stored in the other of the two readout blocks 801. Similarly, in the readout circuit 310, the output of the pixel 101 located at the first line/second column is stored in the readout block 801.

Then, the horizontal shift register 306 raises the selection pulse signal Ph1 to the high-level, and turns on the selection switches 303a and 304a. Accordingly, the electric charge held by the readout block 801 corresponding to the vertical output line 308a is given to the differential amplifier 305 as a voltage, is processed by a differential process in the differential amplifier 305, and is outputted from an output terminal OUT as an output voltage.

Then, the horizontal shift register 309 raises the selection pulse signal Ph2 to the high-level, and turns on the selection switches 303b and 304b. The electric charge held at the readout block 801 corresponding to the vertical output line 308b is applied to the differential amplifier 311 as pressure by this, and a differential process is carried out in the differential amplifier 311, and it is outputted to the output terminal OUT as output voltage.

Then, the horizontal shift register 306 raises the selection pulse signal Ph3 to the high-level, and turns on the selection switches 303c and 304c. Accordingly, the electric charge held by the readout block 801 corresponding to the vertical output line 308c is given to the differential amplifier 305 as a voltage, is processed by a differential process in the differential amplifier 305, and is outputted from an output terminal OUT as an output voltage.

Although omitted in FIG. 4, as shown in FIG. 8, reset switches 805 and 806 are arranged on the output line from the readout block 801 to the differential amplifier 305. These reset switches 805 and 806 are turned on/off according to a reset pulse signal Pchres.

During intervals between the readout operations for the respective lines of the CMOS sensor 100, as shown in FIG. 7, the reset pulse signals Pchres are applied to the gates of the reset switches 805 and 806. Accordingly, the horizontal output capacitors Chn and Chs shown in FIG. 8 are reset to reset voltages VCHRN and VCHRS.

As mentioned above, the readout operation from the pixels 101 arranged in the first line of the CMOS sensor 100 is completed. After that, two lines are skipped as mentioned above, and then, the readout operation from the pixels 101 arranged in the fourth line of the CMOS sensor 100 is executed. The readout operations are executed similarly and the readout operations from all the pixels 101 will be completed.

Here, since two of three lines are thinned out in the readout operation in the moving image pickup mode as mentioned above, an aspect ratio of a displayed image is not in agreement with an aspect ratio of the actual image formed on the CMOS sensor 100 when the image is displayed using the output signals as-is. Therefore, the image processing device 505 shown in FIG. 1 executes an interpolation process for calculating the arithmetic mean of signals of pixels in the horizontal direction, for example, to create a moving image. Since the above mentioned operation enables to synchronize the storage times of the respective parts of the moving image, the display circuit 508 is able to display an image without distortion between the upper and lower parts.

Although two of three lines are thinned out in the above-described embodiment, the pixels 101 having the charge retention section 103 may be arranged in one of five lines and four of five lines may be thinned out to obtain an image. That is, when all the lines in the CMOS sensor 100 are divided into sections each of which has k lines (k is three or more odd number), the pixels 101 are arranged only in a first line of every section.

Anyway, the pixels 101 having the charge retention section 103 are arranged in lines determined by a predetermined pattern among the lines of the CMOS sensor 100. When shooting the moving image, the lines other than the lines in which the pixels 101 having the charge retention section 103 are arranged are thinned out.

Next, an operation in the still image pickup mode using the CMOS sensor that has the pixel arrangement shown in FIG. 2 will be described.

Figure 9:
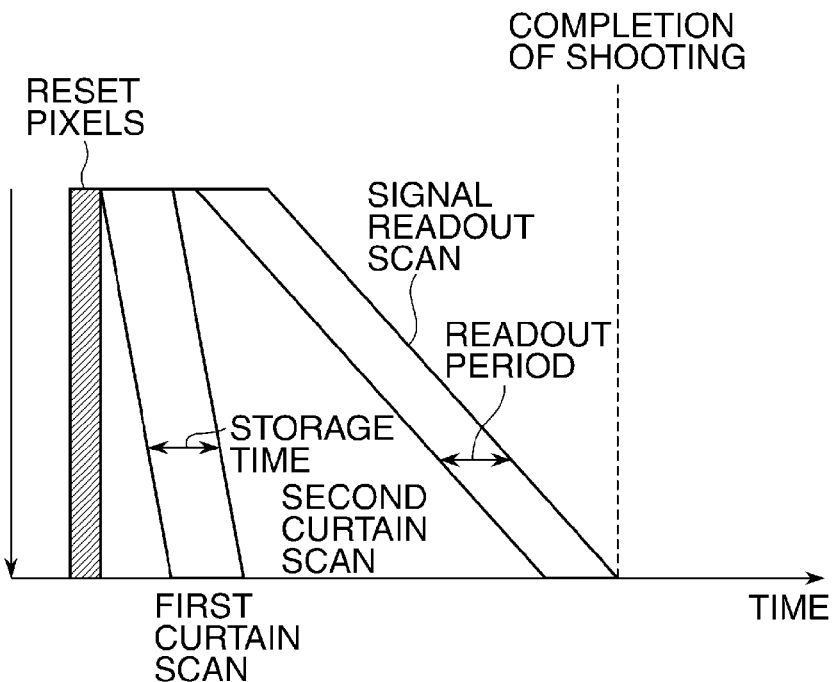
FIG. 9 is a view describing an operation of the image pickup apparatus shown in FIG. 1 in a still image pickup mode.

FIG. 9 is a view describing an operation of the image pickup apparatus shown in FIG. 1 in the still image pickup mode. First, a reset operation of the pixels is performed. For example, all the lines are reset at a time by raising the reset pulse signals PRES2(*n*), PRES2(*n*+1), and PRES2(*n*+2) to the high-level.

Then, first curtain and second curtain of a focal plane shutter are controlled to store an electric charge in predetermined time. Usually, the curtains of the shutter are scanned in a vertical direction. After completion of the electric charge storage, the readout operation is sequentially performed from the first line. It should be noted that the reset switch 202 of the pixel 101 always becomes OFF state at the time of shooting an still image.

As a result of such an operation, the operation of the pixel 101 with the charge retention section 103 becomes equivalent to the operation of the pixel 102 without the charge retention section 103.

Figure 10:
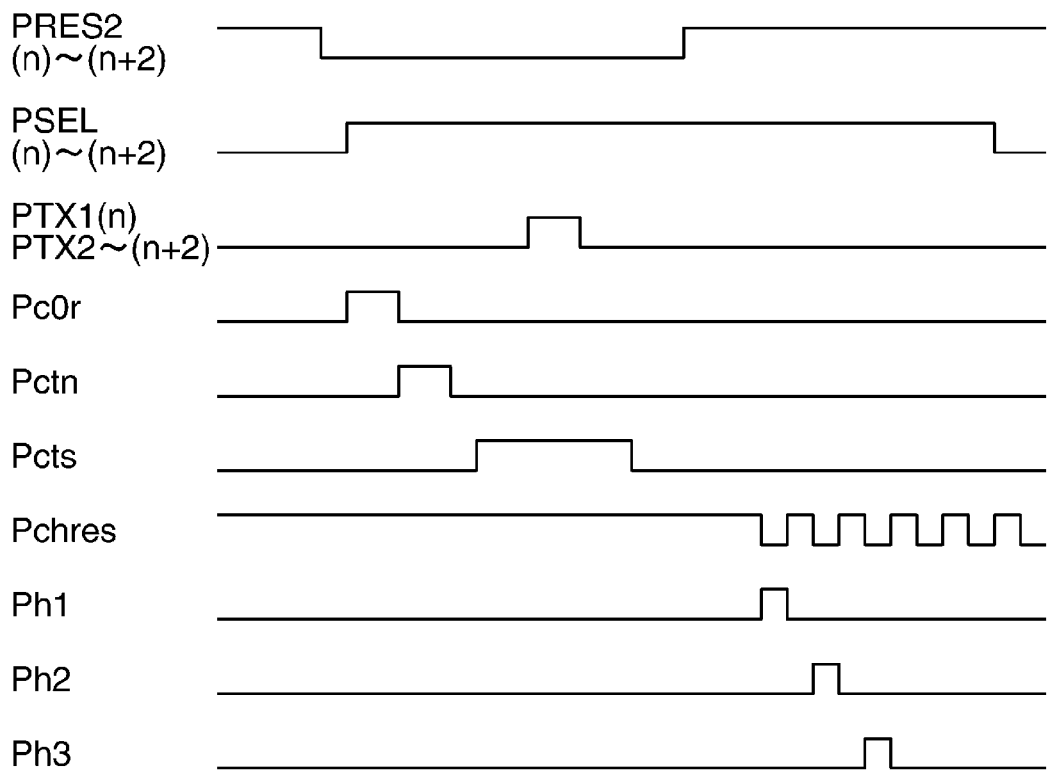
FIG. 10 is a timing chart showing an example of the readout operation of the image pickup apparatus shown in FIG. 1 in the still image pickup mode.
Figure 11:
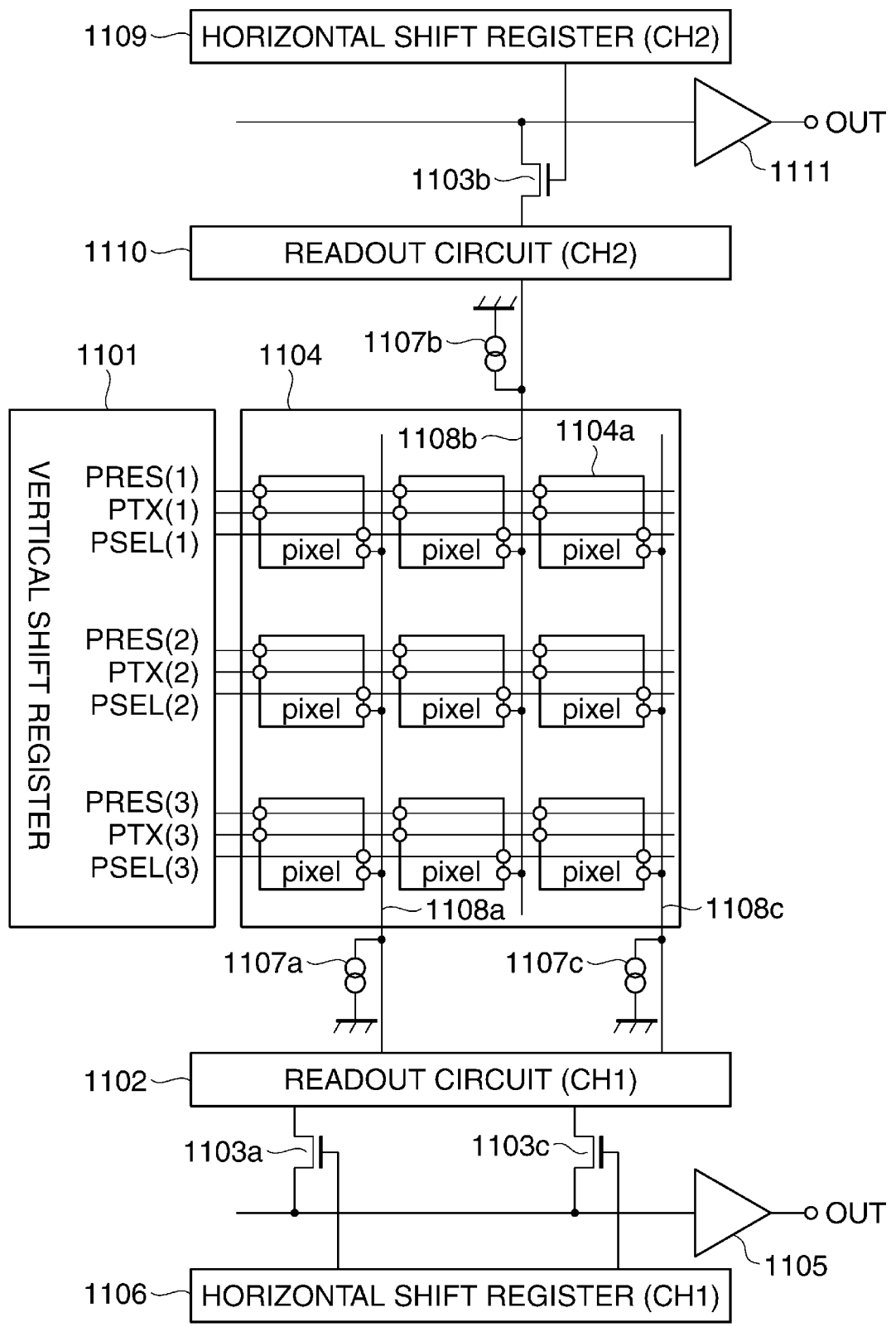
FIG. 11 is a block diagram schematically showing an example of the configuration of the conventional CMOS image pickup unit.
Figure 12:
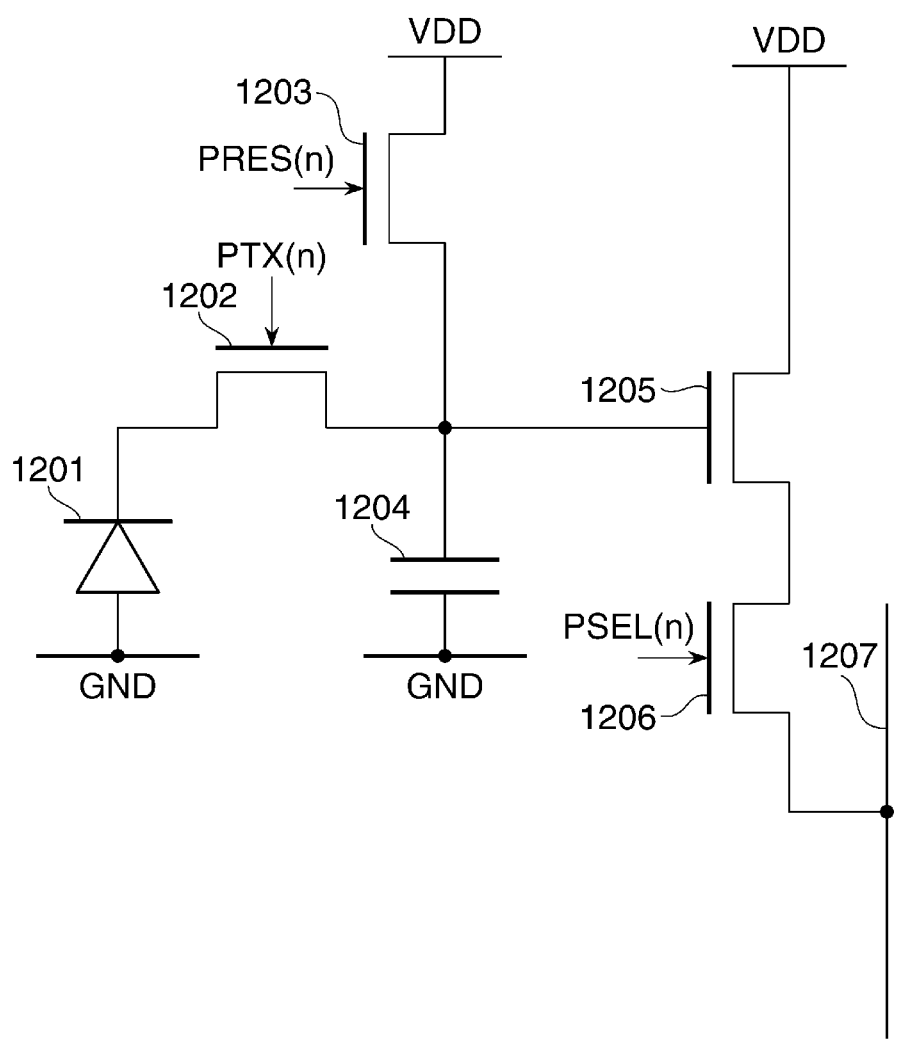
FIG. 12 is a view showing an example of a pixel circuit of a CMOS sensor in the CMOS image pickup unit shown in FIG. 11.
Figure 13:
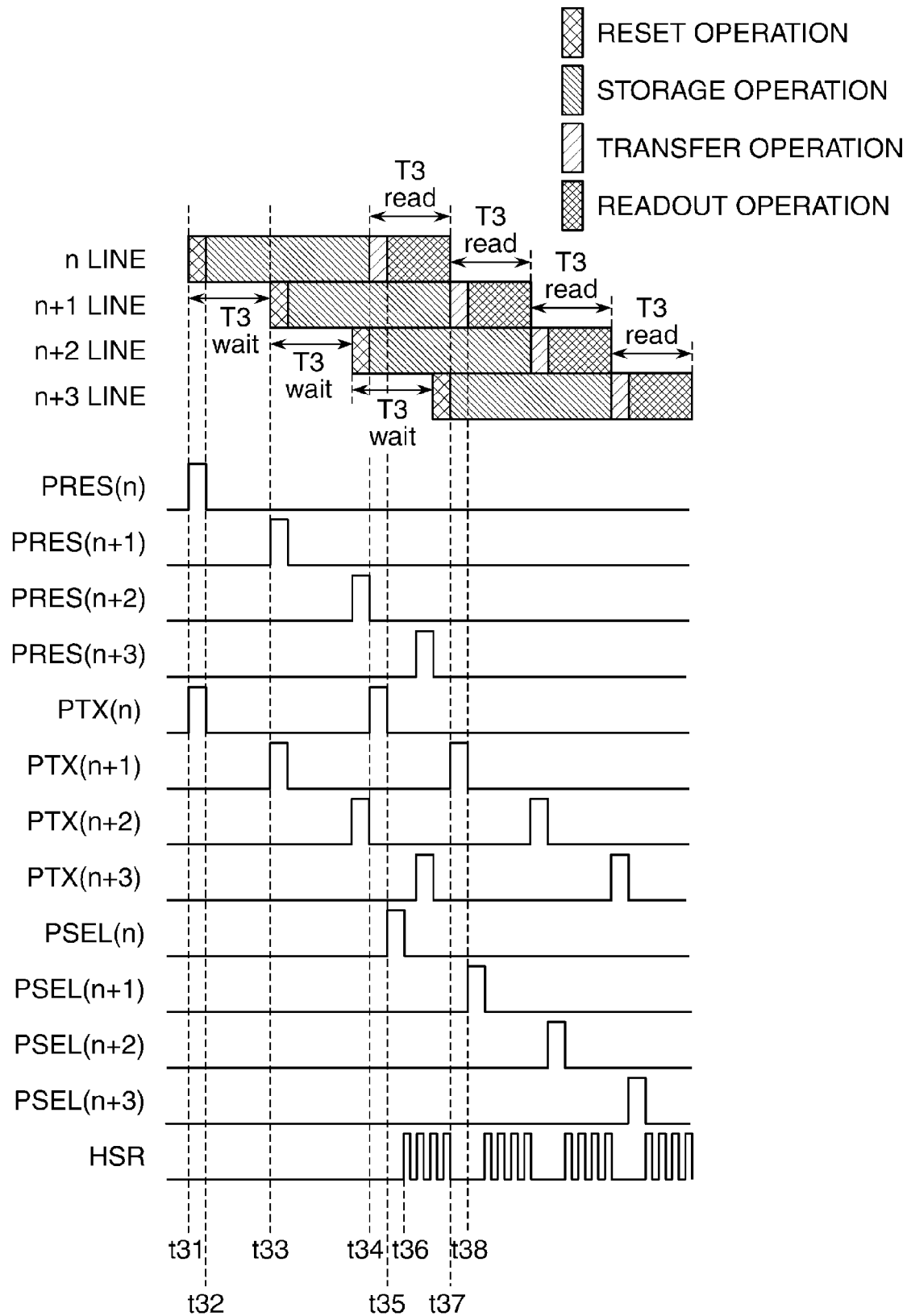
FIG. 13 is a timing chart showing an example of a drive method of the CMOS image pickup unit shown in FIG. 11.
Figure 14:
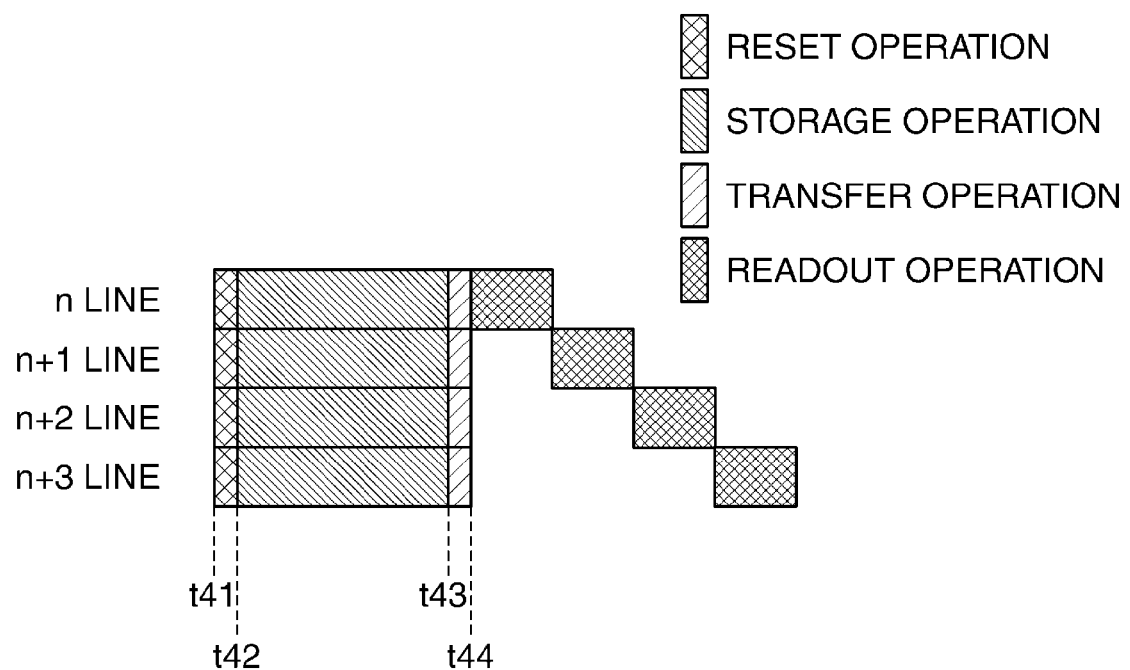
FIG. 14 is a timing chart showing another example of the drive method of the CMOS image pickup unit shown in FIG. 11.

Next, the readout operation in the above-mentioned still image shooting mode will be described in detail. FIG. 10 is a timing chart showing an example of the readout operation of the image pickup apparatus shown in FIG. 1 in the still image pickup mode.

The operation will be described with reference to FIG. 3, FIG. 4, and FIG. 8 in addition to FIG. 10. Before reading electric charges from the PD 201 and the PD 210, the vertical shift register 301 raises the reset pulse signals PRES2(*n*), PRES2(*n*+1), and PRES2(*n*+2) to the high-level. That is, the gate voltage of the reset switch 208 becomes the high-level. This resets the gate voltage of the source follower amplifier 206 to a reset power supply voltage.

When the reset pulse signals PRES2(*n*), PRES2(*n*+1), and PRES2(*n*+2) return to the low-level, i.e., when the gate voltage of the reset switch 208 returns to the low-level, the gate voltage Pc0*r* of the clamp switch 802 shown in FIG. 8 becomes the high-level concurrently.

Then, the vertical shift register 301 raises the selection pulse signals PSEL(n), PSEL(n+1), and PSEL(n+2) to the high-level. That is, the gate voltage of the selection switch 207 becomes the high-level. Accordingly, the reset signal on which a reset noise is superimposed (a noise signal) is read out to the vertical output line 211, and is clamped by the clamp capacitor C0 of each column.

Next, after the gate voltage Pc0*r* of the clamp switch 802 returns to the low-level, the gate voltage Pctn of the transfer switch 803 at a noise signal side becomes the high-level, and a reset signal is held by a noise retention capacitor Ctn of each column.

After the gate voltage Pcts of the transfer switch 804 at the pixel signal side becomes the high-level, the vertical shift register 301 raises the transfer pulse signals PTX1(*n*), PTX2(*n*), PTX2(*n*+1), and PTX2(*n*+2) to the high-level. That is, the gate voltage of the transfer switch 209 and the gate voltage of the transfer switch 203 become the high-level.

Accordingly, the voltages corresponding to the electric charges stored in the PD 201 and the PD 210 are outputted to the vertical output line 211 from the source follower amplifier 206.

Next, the vertical shift register 301 lowers the transfer pulse signals PTX1(*n*), PTX2(*n*), PTX2(*n*+1), and PTX2(*n*+2) to the low-level. That is, the gate voltages of the transfer switches 203 and 209 return to the low-level. Then, the gate voltage Pcts of the transfer switch 804 at the pixel signal side becomes the low-level.

Accordingly, a change from the reset signal is read out and held by a signal retention capacitor Cts of each line. According to the above-mentioned operation, the electric charges of the pixels 101 arranged in the first line are held by the signal retention capacitors Ctn and Cts of each column.

Then, the gate voltages of the selection switches 303*a*, 303*c*, 304*a*, and 304*c* become the high-level in response to the selection pulse signals Ph1 and Ph3 supplied from the horizontal shift register 306. The gate voltages of the selection switches 303*b* and 304*b* become the high-level in response to the selection pulse signal Ph2 supplied from the horizontal shift register 309.

And the electric charges held by the signal retention capacitors Ctn and Cts are sequentially read out, and are processed by the differential processes in the differential amplifiers 305 and 311, and are sequentially outputted from the output terminals OUT. During intervals between the readout operations for the respective lines, the reset pulse signals Pchres turn on and off the reset switches 805 and 806. Accordingly, the horizontal output capacitors Chn and Chs shown in FIG. 8 are reset to the reset voltages VCHRN and VCHRS.

As mentioned above, the readout operation from the pixels 101 arranged in the first line is completed. Similarly, the vertical shift register 301 executes the readout operations from the pixels arranged in the second and later lines, and the readout operations from all the pixels will be completed.

Although the transfer pulse signals PTX1(*n*), PTX2(*n*), PTX2(*n*+1), and PTX2(*n*+2) are driven at a time in the above-mentioned embodiment, the transfer pulse signal PTX1(*n*) may always be in the high-level state.

However, as shown in FIG. 2, the image sensor 100 consists of the pixels 101 with the charge retention section 103 and the pixels 102 without the charge retention section 103 in the embodiment. Therefore, the output voltage of the pixel 101 is different from that of the pixel 102 even if these pixels store the same light amount.

Moreover, since the PD 201 of the pixel 101 and the PD 210 of the pixel 102 are different in size as mentioned above, the outputs differ with respect to the same exposure. Therefore, it is necessary to compensate the output voltage obtained from the pixel 101.

The following methods can be used as a compensation processing method. For example, values of the output voltages to the same exposure are measured beforehand, and an output difference is obtained. And the compensation process is executed using the output difference as a ratio of sensitivities of the pixels 101 and 102.

Alternatively, an output voltage V101' may be calculated from the output voltage V101 of the pixel 101 according to the following equation based on an area ratio α between the PD 201 and the PD 210 and a capacitive divider of the capacitors.

$$V101' = \alpha (CFD101 + CM)/CFD102 \times V101 \quad \text{[Math. 1]}$$

Here, CM denotes capacity of the charge retention section 103, CFD101 denotes capacity of the FD 205 in the pixel 101, and CFD102 denotes capacity of the FD 205 in the pixel 102.

When the output voltage of the pixel 101 is compensated in this way, a suitable still image can be obtained without spoiling sensitivity, even if the CMOS sensor 100 that has a small-size photodiode like the PD 201 is used. Here, the image processing device 505 shown in FIG. 1 functions as a compensation unit.

It should be noted that this compensation is desirable to be performed in the moving image pickup mode so as to match the sensitivity in a moving image to the sensitivity in a still image.

As mentioned above, according to the image pickup apparatus according to the embodiment of the present invention, since the CMOS sensor 100 is provided with the pixel 101 that has the charge retention section 103, and an image is generated in response to output voltages of the pixel 101 in the moving image pickup mode, an moving image that does not cause distortion between the upper and lower parts of the display screen can be obtained without enlarging circuit scale. Since a still image is generated corresponding to the output voltages of the pixels 101 and 102 in the still image pickup mode, a still image can be obtained without spoiling a dynamic range.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 CMOS sensor
101,102 Pixel
103 Charge retention section
201,210 Photo diode (PD)
202,208 Reset switch
203,209 Transfer switch
205 Storage area (FD)
207 Selection switch
301 Vertical shift register (Vertical scanning circuit)
302,310 Readout circuit
306,309 Horizontal shift register (Horizontal scanning circuit)

The invention claimed is:

1. An image pickup apparatus that generates an image corresponding to an incident light, comprising:
   an image sensor that is configured by arranging a plurality of first type pixels and a plurality of second type pixels, wherein each of the plurality of first type pixels comprises a photoelectric conversion section that generates an electric charge corresponding to the incident light, a charge storage section that stores the electric charge transferred from the photoelectric conversion section, a charge retention section that temporally holds the electric charge generated by the photoelectric conversion section before transferring to the charge storage section, and an output section that outputs a voltage corresponding to the electric charge stored in the charge storage section, and each of the plurality of second type pixels comprises a photoelectric conversion section that generates an electric charge corresponding to the incident light, a charge storage section that stores the electric charge transferred from the photoelectric conversion section, and an output section that outputs a voltage corresponding to the electric charge stored in the charge storage section;
   a setting unit that sets up a moving image pickup mode or a still image pickup mode; and
   a control unit that controls to generate an image corresponding to the output voltage from the plurality of first type pixels when the setting unit sets up the moving image pickup mode, and to generate an image corresponding to the output voltages from the plurality of first type pixels and the plurality of second type pixels when the setting unit sets up the still image pickup mode.

2. The image pickup apparatus according to claim 1, wherein each of the plurality of first type pixels further comprises a first transfer switch that transfers the electric charge to the charge retention section from the photoelectric conversion section, and a second transfer switch that transfers the electric charge to the charge storage section from the charge retention section.

3. The image pickup apparatus according to claim 1, wherein each of the plurality of first type pixels and each of the plurality of second type pixels further comprise a reset section that resets the electric charge stored in the photoelectric conversion section.

4. The image pickup apparatus according to claim 1, wherein the plurality of first type pixels and the plurality of second type pixels are arranged in a matrix form, and the plurality of first type pixels are arranged in a predetermined pattern.

5. The image pickup apparatus according to claim 4, wherein the plurality of first type pixels are arranged in predetermined lines in the matrix form.

6. The image pickup apparatus according to claim 5, wherein the predetermined lines are first lines in sections when all the lines in the matrix form are divided into the sections, each of which has k lines (k is three or more odd number).

7. The image pickup apparatus according to claim 1, further comprising a compensation unit that compensates the output voltage from the plurality of first type pixels according to a difference between sensitivity of the plurality of first type pixels and sensitivity of the plurality of second type pixels.

8. An image sensor that is configured by arranging a plurality of first type pixels and a plurality of second type pixels, characterized in that each of the plurality of first type pixels comprising a photoelectric conversion section that generates an electric charge corresponding to the incident light, a charge storage section that stores the electric charge transferred from the photoelectric conversion section, a charge retention section that temporally holds the electric charge generated by the photoelectric conversion section before transferring to the charge storage section, and an output section that outputs a voltage corresponding to the electric charge stored in the charge storage section, and each of the plurality of second type pixels comprising a photoelectric conversion section that generates an electric charge corresponding to the incident light, a charge storage section that stores the electric charge transferred from the photoelectric conversion section, and an output section that outputs a voltage corresponding to the electric charge stored in the charge storage section characterized in that the plurality of first type pixels include a charge retention section that temporally holds the electric charge generated by the photoelectric conversion section before transferring to the charge storage section, and the plurality of second type pixels do not include the charge retention section.

* * * * *